United States Patent [19]

Andonian et al.

[11] 4,374,153
[45] Feb. 15, 1983

[54] PROCESS FOR CONTROLLING THE PINKING OF ONIONS

[75] Inventors: Harry A. Andonian, Levittown; Warren A. Dickinson, Jr., Glenside, both of Pa.

[73] Assignee: SCM Corporation, New York, N.Y.

[21] Appl. No.: 250,007

[22] Filed: Apr. 1, 1981

[51] Int. Cl.³ .......................... A23B 7/02; A23L 1/22
[52] U.S. Cl. .................................. 426/321; 426/626; 426/640; 426/473
[58] Field of Search ............... 426/321, 626, 254, 442, 426/456, 457, 473, 640

[56] References Cited

U.S. PATENT DOCUMENTS

| 2,509,719 | 5/1950 | Birdseye | 426/640 |
| 2,799,096 | 7/1957 | Scott | 34/31 |
| 3,378,380 | 4/1968 | Yamamoto et al. | 99/204 |
| 3,607,316 | 9/1971 | Hume | 99/204 |
| 3,973,047 | 8/1973 | Linaberry et al. | 426/473 |

OTHER PUBLICATIONS

Joslyn et al., "Reddening of White Onion Bulb Purees," AGRICULTURAL AND FOOD CHEMISTRY, 6, 754 (1958).

Lukes, "Pinking of Onions During Dehydration," FOOD TECH 13: 391 (1959).

Joslyn et al., "Reddening of White Onion Tissue," AGRICULTURAL AND FOOD CHEMISTRY, 8, 72 (1960).

Yamaguchi et al., "Factors Affecting the Formation of a Pink Pigment in Purees of Onion," PROC. AM. SOC. HORT. SCI., 86, 475 (1965).

Shannon et al., "Reactions Involved in Formation of a Pink Pigment in Onion Purees," J. AGR. FOOD CHEM., 5, 417 (1967).

Primary Examiner—Raymond N. Jones
Assistant Examiner—George C. Yeung
Attorney, Agent, or Firm—Richard H. Thomas

[57] ABSTRACT

Dehydrated onion products can be prepared using a wide variety of drying conditions without pinking of the onions by treating the onions with an effective amount of base before or during the initial stages of drying.

11 Claims, 2 Drawing Figures

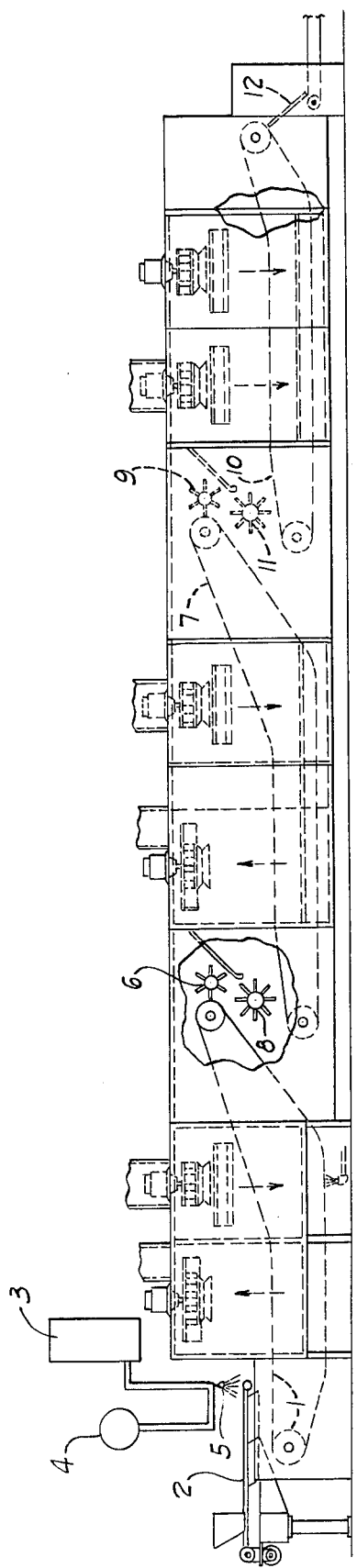
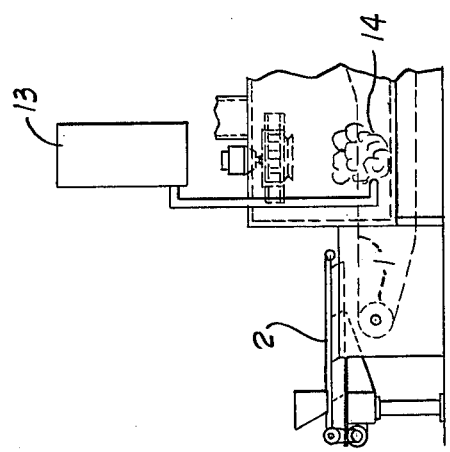
Fig. 1
Fig. 2

PROCESS FOR CONTROLLING THE PINKING OF ONIONS

BACKGROUND OF THE INVENTION

The present invention relates to a method and apparatus for drying onions.

After cutting, chopping, slicing, etc., onions tend to turn pink because of the bruising of the onion flesh that occurs during the cutting operation. This discoloration reduces the onion products' value and salability in the marketplace. In addition, "pinking" is accelerated by the conditions that exist during the early stages of dehydrating onion products. Therefore, pinking has been and continues to be a recurring problem encountered by onion dryers who dehydrate large volumes of onion pieces for sale.

When onions are dehydrated, the quality of the finished product is greatly influenced by the time-temperature conditions to which they are exposed. In general, to prevent pinking, low-temperature, low-humidity air, and relatively rapid initial drying are employed in an attempt to prevent the pink discoloration. Low temperatures result in extended drying times. Low-humidity air can only be maintained when recirculation is not practiced in the initial stages of the dryer and fresh air is circulated through the onions only once and then returned to the atmosphere thus making very inefficient use of the heat value of that air.

Also, relatively low loading of the dryers in the initial stages has been required to obtain rapid drying of the product; and yet the particle size of the onion pieces being dried could not be reduced to the point where the drying was particularly rapid. Normal slicing or dicing is conducted commercially, but the cutting instruments must be maintained extremely sharp to minimize bruising of the onions which increases their tendency to pink.

It can be easily seen that the above criteria previously required to prevent pinking tend to work at cross purposes to energy efficient onion dehydration. Therefore, if the pinking problem can be handled by a means other than controlling the drying parameters, a more efficient dehydration process for onions could be practiced.

Investigations into the mechanism of pinking have indicated that a complex series of reactions are involved which include the formation of at least one precursor. For the most part, these investigations have used onion purees and onion juice to study the pinking reactions. Various factors were identified in the studies which affect pinking in onions, including pH. However, none of the studies which considered pH to be a factor studied pinking during dehydration, and none even studied pinking of commercial onion products, only purees and juice.

Joslyn, et. al., "Reddening of White Onion Bulb Purees," *AGRICULTURAL AND FOOD CHEMISTRY*, 6, 754 (1958) at page 757, Column 2, states while discussing the effects of pH on pinking during storage that: "The complete loss in tendency to redden was accompanied by general deterioration in quality, softening of both outer and inner scale tissue."

Contrary to these teachings, applicants have found that treatment with a base to raise the pH of the onion pieces, at least on their surfaces, in conjunction with drying can be used to prevent pinking without the general deterioration in quality described in the art.

One advantage of the present process is that it allows a greater flexibility in the other drying parameters of the overall dehydration process.

A further advantage of the present process is that it allows the use of a greater proportion of recycled air during dehydration.

A still further advantage is that the present process minimizes the need for repeated sharpening of the onion cutting instruments to prevent bruising.

These and other advantages will become more apparent from the detailed description of the invention.

SUMMARY OF THE INVENTION

The present invention is a process for dehydrating onion pieces without pinking which comprises contacting the onion pieces with an amount of base effective for inhibiting pinking of the onion pieces until a predetermined moisture content is achieved below which pinking does not normally occur and drying the onions to a moisture content not substantially greater than the predetermined moisture content.

BRIEF DESCRIPTION OF THE DRAWINGS

FIG. 1 shows a side elevation view of a three-stage onion dryer illustrating an apparatus for spraying the onion pieces with a basic solution before entering the dryer.

FIG. 2 illustrates a portion of the first stage of a dryer similar to that shown in FIG. 1 except that apparatus is shown for introducing base as a fog within the first stage of the dryer.

DETAILED DESCRIPTION OF THE INVENTION

The present process for preventing the pinking of onions during dehydration can be practiced in combination with any process or schedule for drying onions.

An exemplary process for drying onions is described in U.S. Pat. No. 3,378,380. According to that process, onions are dried in two stages. In the first stage, cutup pieces of onion are dried to a moisture level where cell rupture no longer produces discoloration or enzymatic action and at which the pieces are free-flowing granules at room temperature. The pieces of onion are then milled to a finer particle size and are further dehydrated to the final moisture level.

Another process for drying onions is described in U.S. Pat. No. 2,799,096. According to this patent, onion pieces are first dried into a moisture content of between 45 and 55% BDB. BDB indicates bone dry basis and is a measure of the moisture content of the onion by weight as a percentage of the weight of the bone dry onion solids. The partially dried pieces are then mixed and rearranged and further dried in a second stage to a moisture content of between 20 and 35% BDB and finally rearranged again and dried to a moisture content between 8 and 15% BDB. In each of the first two stages there are alternating air flows; air first being passed from the top downwards through the onion layer and then from the bottom upwards through the onion layer.

Either of these processes or any other known process or schedule for drying of onions can be utilized in the present invention. The present process is particularly useful in commercial scale onion drying operations where its real economies can be realized.

Accordingly, FIGS. 1 and 2 show apparatus suitable for drying onions according to the present invention utilizing a drying schedule substantially in accordance with U.S. Pat. No. 2,799,096. To this end, the onions are loaded on a first conveyor 1 by a loading mechanism 2. While on the loading mechanism 2 before being transferred onto the first conveyor 1, the onions are sprayed with a solution of a base. The basic solution is stored in tank 3 and spraying is accomplished utilizing compressed air stored in reservoir 4, the basic solution being atomized by the compressed air at spray nozzle 5 for efficient application to the onion pieces. The first conveyor 1 carries the onions through the first stage of the dryer which consists of at least two compartments in which the air circulation alternates successively from upward circulation to downward circulation normal to the conveyor. Optionally, a plurality of compartments can be utilized in this section of the dryer. Preferably, the onions are disposed on the first conveyor to a depth of 2½ to 4½ inches or greater. Throughout the first stage, temperature is maintained at a predetermined level. Ordinarily, this temperature ranges between 160° and 220° F.

At the end of the first stage, the onions are stripped from the conveyor by means of a doffer 6 and are deposited on a second conveyor 7 by means of a breaker 8 which breaks apart the onion pieces which have become adhered or matted together. The conveyor 7 moves slower than the conveyor 1 so that the onion pieces are deposited on the second conveyor to a greater depth than on the first conveyor, preferably between 3 and 6 inches or greater.

The second conveyor 7 carries the onion through the second stage of the dryer which is maintained at a temperature level preferably between 130° and 170° F. Whereas in the first stage, the onion pieces were dried to about 30–60% BDB, the second stage of the dryer effects drying to about 20–35% BDB.

At the end of the second stage, the onion pieces are stripped from the conveyor 7 by means of a second doffer 9 and are deposited on a third conveyor 10 by means of a second breaker 11. The third conveyor moves slower than the second conveyor so that the onion pieces are deposited to a greater depth than on the second conveyor. Preferably, the depth ranges between 6 and 12 inches; however, it can be substantially deeper than this. The third stage of the dryer is maintained at a predetermined temperature level, preferably between 120° and 135° F., so that when the onion pieces are discharged as indicated at 12, their moisture content is preferably between 8% and 15% BDB. In commercial operations the onion pieces are frequently transferred at this point to a bin-type dryer for final dehydration to a moisture content of about 5% BDB or less.

FIG. 2 shows a loading mechanism and entry into the first stage of an onion dryer similar to that shown in FIG. 1. According to the embodiment shown in FIG. 2, onions are loaded on a first conveyor 1 by a loading mechanism 2. The first conveyor carries the onion pieces into the first stage of the dryer wherein the onion pieces are contacted with a basic fog 14 sprayed from a basic material storage tank 13 directly into the first stage of the dryer. The fog 14 can consist of either suspended droplets of basic solution or a gaseous base. After contacting with the fog 14, the onions are dried as described in connection with FIG. 1.

Other base application systems and dryers can be used within the scope of the present invention. For example, the base could be sprayed on the onion pieces by pumping the basic liquid through a nozzle. The base could also be sprayed on the onion pieces while on a separate conveyor located before the abovedescribed loader mechanism. The onion pieces could even be dipped into the basic solution or flooded with a stream of basic solution. The method of application of the base is not critical to the present invention as long as the onion pieces are contacted with the base after cutting.

The specific base utilized or its physical form are not critical in the present invention. For conveniece of application, a solution of base is recommended; however, liquid or gaseous bases can be utilized. The base can be an organic or an inorganic base. The term "base" as used herein is understood to include Lewis bases and other materials which tend to increase the pH of the surface of an onion when in contact therewith and mixtures thereof. Relatively dilute solutions containing about 1% to about 10% base are preferred for their ease of application; however, any effective concentration can be used. The dilution of the solution appears to be limited only by the practicality that excessive water on the onions must be subsequently dried.

According to the Chemical Rubber Company HANDBOOK OF FOOD ADDITIVES (1968), the following basic materials are generally recognized as safe for use as miscellaneous and/or general purpose food additives under FDA Section 121.101: Ammonium bicarbonate, ammonium carbonate, ammonium hydroxide, ammonium phosphate (mono- or dibasic), calcium carbonate, calcium hydroxide, calcium oxide, calcium phosphate (mono-, di-, and tribasic), calcium pyrophosphate, magnesium carbonate, magnesium hydroxide, magnesium oxide, potassium carbonate, potassium bicarbonate, potassium hydroxide, sodium bicarbonate, sodium carbonate, sodium dihydrogen phosphate, sodium hydroxide, sodium metaphosphate, sodium phosphate (mono-, di-, and tribasic), sodium pyrophosphate, sodium tetrapyrophosphate, and sodium tripolyphosphate. Any of these bases or blends of them are suitable for use in the present invention, as are all other basic materials, at least in theory.

The quantitative amount of base utilized in the present invention is not a critical feature. The amount utilized must be effective to inhibit the production of pink color imparting amounts of colorants in the onion pieces until the moisture content of the onions is reduced to about 60% BDB. Below this moisture content, discoloration of the onion is no longer a substantial problem. A typical procedure is to dry the base-treated onion pieces to about 30% BDB during the initial drying stage and for commercial scale operations drying would be continued until a moisture content of about 5% BDB is obtained.

Freshly cut onion pieces typically have a surface pH in the range of about 4–6.0. After treatment, according to the present invention, the surface of the onion pieces typically has a pH in the range of about 7–8 or greater to effectively suppress pigment formation; however, the pH may be as low as about 6.1 or lower depending on the drying conditions and other factors. Because a number of factors influence the rate and amount of pigment formation, the above must be recognized as generalizations and the specific required treatment for a given drying operation must be determined through experimentation. For example, the amount and rate of pigment formation will vary according to the variety of onion being treated, the degree of bruising that occurs during the cutting of the onions, the drying rate for the dehydration process, minor impurities that are present in the dehydration atmosphere, the base utilized, and the pH of the onion surface.

Having thus described particular embodiments of our invention, it is intended that certain changes and modifications may be made therein without departing from the intended scope of the present invention as described in the following claims.

We claim:

1. A process for dehydrating cut onion pieces and inhibiting the production of pink color in said onion pieces, which comprises the steps of:

drying the onion pieces in a first drying stage;

contacting said onion pieces with a base before or at an initial point in said drying, the amount of base being an effective amount for inhibiting the production of pink color, and continuing the drying of said onion pieces in the presence of said effective amount of base until the moisture content of said onions is reduced to not substantially greater than about 60% Bone Dry Basis.

2. The process of claim 1 wherein said drying is done in a dryer.

3. The process of claim 2 wherein said contacting is by introducing base into the dryer atmosphere.

4. The process of claim 3 wherein said base is a gaseous phase base.

5. The process of claim 3 wherein said base is suspended droplets of basic solution.

6. The process of claim 1 wherein said contacting is by contacting said onion pieces with a dilute solution containing about 1–10% of a base.

7. The process of claim 1 wherein said base is selected from the group consisting of: Ammonium bicarbonate, ammonium carbonate, ammonium hydroxide, ammonium phosphate (mono- or dibasic), calcium carbonate, calcium hydroxide, calcium oxide, calcium phosphate (mono-, di-, and tribasic), calcium pyrophosphate, magnesium carbonate, magnesium hydroxide, magnesium oxide, potassium carbonate, potassium bicarbonate, potassium hydroxide, sodium bicarbonate, sodium carbonate, sodium dihydrogen phosphate, sodium hydroxide, sodium metaphosphate, sodium phosphate (mono-, di-, and tribasic), sodium pyrophosphate, sodium tetrapyrophosphate, sodium tripolyphosphate, and mixtures thereof.

8. The process of claim 7 wherein said drying is done in a dryer and said contacting is by introducing base into the dryer atmosphere.

9. The process of claim 7 wherein said contacting is by contacting said onions with a basic solution prior to said drying.

10. The process of claim 1 wherein said amount of base is effective to prevent pinking until said onions are dried to a moisture content not substantially greater than about 30% Bone Dry Basis and said drying is until said moisture content is reduced to not substantially greater than 30% Bone Dry Basis.

11. The process of claim 1 wherein said amount of base is effective to prevent pinking until said onions are dried to a moisture content not substantially greater than about 5% Bone Dry Basis and said drying is until said moisture content is reduced to not substantially greater than 5% Bone Dry Basis.

* * * * *

UNITED STATES PATENT AND TRADEMARK OFFICE
CERTIFICATE OF CORRECTION

PATENT NO. : 4,374,153

DATED : February 15, 1983

INVENTOR(S) : Harry A. Andonian and Warren A. Dickinson, Jr.

It is certified that error appears in the above-identified patent and that said Letters Patent are hereby corrected as shown below:

On the title page, [73] Assignee:, the Assignee should be

--Proctor & Schwartz, Inc., Horsham, Pennsylvania-- rather than "SCM Corporation, New York, N.Y.".

Signed and Sealed this

Thirty-first Day of May 1983

[SEAL]

Attest:

DONALD J. QUIGG

Attesting Officer

Acting Commissioner of Patents and Trademarks